United States Patent
Zhou

(10) Patent No.: US 10,985,589 B2
(45) Date of Patent: Apr. 20, 2021

(54) METHOD AND BATTERY MANAGEMENT SYSTEM FOR OPERATING A TRACTION BATTERY IN A MOTOR VEHICLE AND MOTOR VEHICLE HAVING SUCH A BATTERY MANAGEMENT SYSTEM

(71) Applicant: AUDI AG, Ingolstadt (DE)

(72) Inventor: Wei Zhou, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 201 days.

(21) Appl. No.: 15/979,753

(22) Filed: May 15, 2018

(65) Prior Publication Data

US 2018/0361872 A1    Dec. 20, 2018

(30) Foreign Application Priority Data

Jun. 20, 2017   (DE) .......................... 102017210303.5

(51) Int. Cl.
*H02J 7/00* (2006.01)
*H01M 10/613* (2014.01)
(Continued)

(52) U.S. Cl.
CPC ...... *H02J 7/00712* (2020.01); *B60H 1/00278* (2013.01); *B60L 3/12* (2013.01);
(Continued)

(58) Field of Classification Search
None
See application file for complete search history.

(56) References Cited

U.S. PATENT DOCUMENTS

| | | | | |
|---|---|---|---|---|
| 7,550,949 B2 * | 6/2009 | Woo | .................... | H01M 10/617 |
| | | | | 320/150 |
| 8,907,629 B2 * | 12/2014 | Kelty | ..................... | B60L 58/13 |
| | | | | 320/132 |

(Continued)

FOREIGN PATENT DOCUMENTS

| | | |
|---|---|---|
| CN | 102324590 A | 1/2012 |
| CN | 102725182 A | 10/2012 |

(Continued)

OTHER PUBLICATIONS

Examination Report dated Oct. 7, 2019, in corresponding European patent application No. 18 170 963.5 including partial machine-generated English language translation; 7 pages.

(Continued)

*Primary Examiner* — Abdhesh K Jha
(74) *Attorney, Agent, or Firm* — Maier & Maier, PLLC

(57) ABSTRACT

A method for operating a traction battery in a motor vehicle, wherein the traction battery is charged in a charging operating state with a fast-charging device. A quantity of energy to be recharged at the fast-charging device is specified. An anticipated heating of the traction battery is determined depending on a charging capacity, which, taking into consideration a predeterminable maximum charging time, is determined from the quantity of energy that is to be recharged. A starting temperature ($T_{start}$) for the battery charging is determined in such a way that, after the charging operation has been carried out at the fast-charging device, a battery operating temperature ($T_{batt}$) of the traction battery does not exceed an upper limit ($T_{hi}$) for the battery operating temperature. The battery operating temperature ($T_{batt}$) is recorded during a driving operating state of the motor vehicle.

9 Claims, 3 Drawing Sheets

(51) Int. Cl.
  *H01M 10/625* (2014.01)
  *B60H 1/00* (2006.01)
  *B60L 3/12* (2006.01)
  *B60L 53/10* (2019.01)
  *H01M 10/633* (2014.01)
  *B60L 58/26* (2019.01)
  *H01M 10/44* (2006.01)
  *B60L 11/18* (2006.01)

(52) U.S. Cl.
  CPC ........... *B60L 11/1874* (2013.01); *B60L 53/11* (2019.02); *B60L 58/26* (2019.02); *H01M 10/443* (2013.01); *H01M 10/613* (2015.04); *H01M 10/625* (2015.04); *H01M 10/633* (2015.04); *H02J 7/0071* (2020.01); *H02J 7/0077* (2013.01); *H02J 7/0091* (2013.01); *B60H 1/00778* (2013.01); *B60L 2240/36* (2013.01); *B60L 2240/545* (2013.01); *B60L 2240/549* (2013.01); *B60L 2240/60* (2013.01); *B60L 2240/622* (2013.01); *B60L 2240/80* (2013.01); *B60L 2250/16* (2013.01); *B60L 2260/56* (2013.01)

(56) References Cited

U.S. PATENT DOCUMENTS

| | | | |
|---|---|---|---|
| 9,431,849 B2 | 8/2016 | Yan et al. | |
| 2004/0135550 A1* | 7/2004 | Nishihata | H01M 10/615 320/150 |
| 2007/0159134 A1 | 7/2007 | Yamashita | |
| 2010/0050676 A1* | 3/2010 | Takamatsu | B60K 11/02 62/259.2 |
| 2012/0280050 A1* | 11/2012 | Tonozuka | H01M 10/613 236/94 |
| 2014/0375277 A1* | 12/2014 | Yan | H02J 7/007192 320/150 |
| 2015/0010789 A1* | 1/2015 | Yagi | H01M 10/659 429/50 |
| 2015/0162771 A1* | 6/2015 | Monden | H02J 7/007 320/103 |
| 2016/0152149 A1* | 6/2016 | Misawa | B60L 11/182 320/108 |
| 2016/0276719 A1* | 9/2016 | Kikuchi | H01M 10/486 |
| 2018/0272878 A1* | 9/2018 | Lee | B60H 1/00778 |
| 2019/0039477 A1* | 2/2019 | Ohgaki | B60L 50/60 |

FOREIGN PATENT DOCUMENTS

| | | | | |
|---|---|---|---|---|
| CN | 102324590 B | * | 11/2013 | |
| CN | 205407304 U | * | 7/2016 | |
| CN | 106207290 A | | 12/2016 | |
| CN | 104044479 B | * | 11/2017 | ............. B60L 58/26 |
| CN | 107331923 A | * | 11/2017 | .......... H01M 10/615 |
| DE | 102011000573 A1 | | 8/2012 | |
| DE | 102012223054 A1 | | 6/2013 | |
| DE | 112012003099 T5 | | 7/2014 | |
| DE | 102016104065 A1 | | 9/2016 | |
| EP | 2 177 389 A1 | | 4/2010 | |
| EP | 2 529 979 A1 | | 12/2012 | |
| EP | 2 798 695 A1 | | 11/2014 | |
| WO | 2013/097967 A1 | | 7/2013 | |

OTHER PUBLICATIONS

Examination Report dated Feb. 6, 2020, in corresponding European patent application No. 18170963.5 including partial machine-generated English language translation; 9 pages.

European Search Report dated Nov. 12, 2018, in connection with corresponding EP Application No. 18170963.5 (8 pgs.).

German Search Report dated Apr. 4, 2018 of corresponding application No. DE102017210303.5, 12 pgs.

Examination Report dated Jun. 2, 2020 in European Application No. 18 170 9635; 10 pages including partial machine-generated English-language translation.

Chinese Office Action dated Dec. 23, 2020, in connection with corresponding CN Application No. 201810628296.X (32 pp., including machine-generated English translation).

* cited by examiner

METHOD AND BATTERY MANAGEMENT SYSTEM FOR OPERATING A TRACTION BATTERY IN A MOTOR VEHICLE AND MOTOR VEHICLE HAVING SUCH A BATTERY MANAGEMENT SYSTEM

FIELD

The invention relates to a method for operating a traction battery in a motor vehicle in accordance with the preamble of patent claim 1. The invention further relates to a battery management system for operating a traction battery in a motor vehicle in accordance with the preamble of patent claim 9. Moreover, the invention relates to a motor vehicle having such a battery management system.

BACKGROUND

Modern motor vehicles, as purely electric vehicles or as hybrid vehicles, can be equipped with an electrochemical energy storage unit for supplying at least a part of the drive power. Such an energy storage unit provided for the drive (traction) is usually constructed in the form of a battery, in particular in the form of a high-voltage battery with a large number of individual cells that are connected in series. The preferred technology at the present time in this case is an electrochemical cell in the form of a lithium ion rechargeable battery. Accordingly, in conventional language use, the energy storage unit is referred to below as a high-voltage battery or traction battery. A high-voltage battery is understood here, in correspondence with the usual definition, to mean a battery whose voltage is greater than or equal to 60 volts.

Especially in the case of purely electric vehicles, in which the available remaining range of travel is limited by the remaining energy content in the traction battery, there exists the need, in the case of longer routes that are to be traversed, to recharge the traction battery during this trip, with the targeted charging time to be expended for this being in the order of magnitude of a conventional tanking operation with liquid or gaseous fuels.

Because the lithium ion rechargeable batteries are capable of undergoing fast charging—that is, 80 percent of their capacity can be charged within 15 minutes—fast-charging devices are increasingly being made available.

Nowadays, the traction batteries in the electric vehicle (battery electric vehicle, BEV) are generally cooled directly or indirectly via the air conditioning system of the vehicle, wherein, in the direct variant, the coolant flows out of the air conditioning system of the vehicle directly to the traction battery and directly cools the battery. In the indirect variant, the coolant is used in the battery circulation circuit and is re-cooled for the dissipation of heat by a coolant-coolant heat exchanger (chiller) connected to the coolant circulation circuit.

The usual air conditioning systems of vehicles employed at the present time have a cooling capacity of a total of approximately 6 to 8 kilowatts. This dimensioning is normally designed to furnish the cooling capacity needed for the passenger compartment air conditioning and for the temperature control of the battery. At present, a charging infrastructure with a fast-charging technology that provides for a charging capacity of 350 kilowatts and can charge a traction battery to 80 percent of capacity within 15 minutes is being developed. For this fast-charging technology, a temperature control of the battery solely on the basis of the vehicle air conditioning system installed in the motor vehicle is no longer sufficient.

For this purpose, a charging station for fast charging a battery of an electric vehicle is known from DE 11 2012 003 099 T5. The charging station comprises a charging source, which makes available an electric charging, a coolant source, which makes available a coolant, and a connection, which comprises both a portion for the electric feed for supplying the electric charging and also a portion for the coolant feed for supplying the coolant. The connection can be linked to a vehicle and connected to it.

A drawback of a concept of this kind for cooling a traction battery in an electric vehicle is the substantial additional cost not only on the part of the charging station, but also on the part of the electric vehicles, as well as the necessity of a uniform interface.

In another context, a method and a system for the thermal management of a high-voltage battery for a vehicle are known from DE 10 2012 223 054 A1. A control instrument is configured to regulate the temperature of a traction battery within an operating temperature range when the vehicle is in operation. The temperature of the battery is regulated to within a charging temperature range when the battery is connected to the charging device and the power source and when the external temperature lies outside of an ambient temperature range. The battery is preconditioned to a battery operating temperature when the external temperature lies outside of the ambient temperature range and the battery is connected to the charging device and the power source. The interior of the vehicle is preconditioned to the interior temperature when the vehicle is connected to the charging device and the power source and the external temperature lies outside of the ambient temperature range.

Known from DE 10 2016 104 065 A1, moreover, is a method that, among other things, comprises an automatic preconditioning of a passenger compartment of an electrified vehicle during a direct current fast-charging operation of a battery assembly when the electrified vehicle is switched off.

SUMMARY

The object of the present invention is to make available a method for operating a traction battery in a motor vehicle, a battery management system for operating a traction battery in a motor vehicle, and a motor vehicle, by which the cost of controlling the temperature of the traction battery during a fast-charging operation can be reduced.

This object is achieved by a method having the features of patent claim 1, by a battery management system having the features of patent claim 9, and by a motor vehicle having the features of patent claim 10. Advantageous enhancements of the present invention are subjects of the dependent patent claims.

The invention is based on the realization that, during the charging of a traction battery at a fast-charging device with 350 kilowatts, a thermal dissipation power loss of about 17.5 kilowatts is developed in the traction battery, which confronts an installed conventional cooling capacity in the amount of about 6 to 8 kilowatts on the part of the motor vehicle. Such a high power deficit of about 9.5 kilowatts can hardly be covered, even by a technological leap forward, in an air conditioning system of the vehicle. Beyond this, the invention is based on the further realization that the thermal mass of the traction battery can be exploited as a buffer in order to absorb the developing heat loss during a fast-charging operation, without leaving a predetermined temperature range.

The invention ensues from a method for operating a traction battery in a motor vehicle, wherein the traction battery is charged to a charging operating state by use of a fast-charging device. In accordance with the invention, the method is further developed by specifying a quantity of energy that is to be recharged at the fast-charging device, determining a heating of the traction battery that is to be anticipated depending on charging capacity, which is determined taking into consideration a predeterminable maximum charging time from the quantity of energy that is to be recharged, and determining a starting temperature for the battery charging in such a way that, after the charging operation has been carried out at the fast-charging device, a battery operating temperature of the traction battery does not exceed an upper limit of the battery operating temperature. The method further comprises a recording of the battery operating temperature in a driving operating state of the motor vehicle and, in the case that the recorded battery operating temperature is higher than the starting temperature for the battery charging: lowering the battery operating temperature to the starting temperature for the battery charging in the driving operating state.

Through the application of the method according to the invention, it is also possible in regard to the temperature control of the traction battery to realize a fast-charging operation with a charging capacity of 350 kilowatts without additional cost for the charging infrastructure. Furthermore, for a battery-operated motor vehicle with fast-charging capability, it is possible to continue to use the existing air conditioning system of the vehicle and, accordingly, there is no necessity to develop new air conditioning systems. Moreover, a huge cost savings ensues in comparison to the concept involving an external coolant feed, because the method proposed in accordance with the invention can be implemented on components that are already employed at the present time, which are to be correspondingly adapted and do not need any additional hardware.

In accordance with an advantageous enhancement of the invention, the method comprises the further steps of comparing the starting temperature for the battery charging with a lower limit of the battery operating temperature and limiting the starting temperature for the battery charging to this lower limit of the battery operating temperature when the comparison reveals a lower starting temperature for the battery charging than the lower limit of the battery operating temperature. In this way, it is prevented that the traction battery is cooled to a temperature range in which said traction battery can no longer be operated or may be operated only with limitations. Preferably, it can be provided in this connection that, when there is a necessary limitation of the starting temperature for the battery charging to the lower limit of the battery operating temperature, the predetermined quantity of energy to be recharged is reduced and/or the predeterminable charging time is prolonged. Such an adjustment of the parameters for the fast-charging operation can occur, in particular, taking into consideration the preferences of a user and, in particular, of a driver of the motor vehicle. Thus, it can be provided, for example, that, instead of a single intervening stop at a fast-charging device, two intervening stops at two different fast-charging devices at spaced-apart times are to be provided, wherein the time interval in the driving operation between the first intervening stop and the following second intervening stop can be utilized to lower once again the battery operating temperature that has been raised by the fast-charging operation.

More advantageously, it is provided in the application of the method that the upper limit of the battery operating temperature is chosen in such a way that, after the conclusion of the charging operation, the traction battery is not in a temperature range in which the deliverable power is already reduced and, in particular, is markedly reduced. It is ensured in this way that, after the conclusion of the fast-charging operation, the motor vehicle is immediately capable of switching to the driving operating state; that is, the driver of the motor vehicle can continue to drive immediately after the "tanking operation."

In accordance with an advantageous enhancement, the method comprises the further steps of determining an excess cooling capacity availability in the driving operating state, determining a required temperature lowering time from a quantity of thermal energy to be dissipated from the traction battery that is a function of the recorded battery operating temperature and the starting temperature for the battery charging as well as depending on the availability of excess cooling capacity and depending on the quantity of energy to be dissipated, determining an anticipated arrival time at the fast-charging device depending on the remaining route to be travelled to the fast-charging device, and starting the lowering of the battery operating temperature at the latest at a point in time that is determined from the anticipated arrival time, minus the required temperature lowering time.

In this way, it is ensured that the cooling of the traction battery is started in a timely manner in order to be able to carry out the fast-charging operation immediately with the provided starting conditions upon arrival at the fast-charging device.

In accordance with an advantageous enhancement, the method comprises the further step of determining the quantity of energy that is to be recharged depending on a destination input in a navigation device of the motor vehicle. In particular, the determination of the quantity of energy that is to be recharged is made depending on the position of the destination and/or on the availability of a charging device at the position of the destination. When the quantity of energy to be recharged is to be carried out at a single fast-charging device and no further intervening stop is planned up to arrival at the destination, the quantity of energy to be recharged obviously has to make possible a travel range of the motor vehicle that is adequate to reach this destination.

A corresponding safety reserve for taking into account any deviation of the travel range prediction from the actual travel range is presupposed at this point and will always be presupposed tacitly below, because unanticipated events, such as, for example, unreported detours can have an influence on the travel range. In addition, the need for additional cooling capacity that arises from the anticipated cooling of the traction battery by the air conditioning system also obviously needs to be taken into consideration.

In addition, however, it also needs to be taken into consideration in an advantageous way whether a charging device is present at the location of the destination, which will enable a recharging of the traction battery at the location of the destination. Such a charging device at the position of the destination can be made available, for example, by a private or public power grid terminal that is accessible for charging purposes, such as, for example, 230 volts alternating voltage at a single-phase terminal or 400 volts at a three-phase terminal.

In accordance with an advantageous enhancement, the method comprises the step of determining the position of the fast-charging device depending on the position of the motor vehicle, and depending on the available remaining travel range of the motor vehicle. Accordingly, it is ensured that only a fast-charging device that can also be reached by the motor vehicle is chosen.

In accordance with an advantageous enhancement, the invention comprises the further steps of displaying to a user of the motor vehicle the fast-charging device whose position has been determined to be within the remaining travel range of the motor vehicle, confirming the intended use of the displayed fast-charging device by the user, and starting the lowering of the battery operating temperature to the starting temperature for the battery charging by means of a battery management system. It is thereby ensured that the lowering of the battery operating temperature to the starting temperature for the battery charging is carried out only when there is an actual specific intended use by the driver of the motor vehicle. Any unnecessary waste of the energy stored in the traction battery is thereby avoided under circumstances when the driver does not have any intention to make use of the fast-charging operation at said fast-charging device. Alternatively, it can be provided for the fast-charging device to be operated solely with a charging capacity that is increased when compared to a standard charging station, but which still lies substantially below the 15 minutes of charging capacity, in order to charge the motor vehicle for one hour during a lunch break of the driver, for example. In this case, the requirement for power loss can be discharged completely from the on-board air conditioning system.

In accordance with an advantageous design, the specification of the quantity of energy that is to be recharged results as the difference between the maximum quantity of energy that can be stored in a full state of charge of the traction battery and an anticipated residual quantity of energy remaining in the traction battery when the fast-charging device is reached. This virtually corresponds to a "full tanking" of the traction battery. Accordingly, through a fast-charging operation of this kind, the greatest possible range of the motor vehicle is made available.

In accordance with an advantageous enhancement of the invention, the method comprises the further step of retrieving data on the state of the fast-charging device via a mobile network and/or reserving a charging time window at the fast-charging device. The advantages of the method according to the invention are evidenced, in particular, taking into account the modern infrastructure that is available. In this way, the operating concept can be adapted in the current implementation and accordingly optimized, and therefore can be adjusted to any changed parameters. This is of advantage, in particular, when a plurality of possible fast-charging devices are to be considered and their availability, their compatibility with the motor vehicle, etc. needs to be checked beforehand. For avoiding waiting times and accordingly for the best possible exploitation of the advantages of the fast-charging operation provided by the invention, a reservation of a charging time window at the fast-charging device is provided.

The invention further ensues from a battery management system for operating a traction battery in a motor vehicle, comprising a control unit that, in a charging operating state, is designed to control the charging of the traction battery with a fast-charging device. In accordance with the invention, the battery management system is further developed by a state-of-charge regulator, which is designed to specify a quantity of energy that is to be recharged at the fast-charging device, by a simulation computing unit for determining a heating of the traction battery that is to be anticipated depending on charging capacity, which, taking into consideration a predeterminable maximum charging time, can be determined from the quantity of energy that is to be recharged, wherein the simulation computing unit is designed to determine a starting temperature for the battery charging in such a way that, after the charging operation has been carried out at the fast-charging device, a battery operating temperature of the traction battery does not exceed an upper limit of the battery operating temperature. In addition, the battery management system comprises a temperature sensor for recording the battery operating temperature in a driving operating state of the motor vehicle as well as a battery cooling apparatus, which, in the driving operating state, is designed to lower the battery operating temperature to the starting temperature for the battery charging if the recorded battery operating temperature is higher than the starting temperature for the battery charging. In addition to the temperature sensor, it is possible to provide at least one additional temperature sensor. When a plurality of temperature sensors are used, the battery operating temperature can be formed as a minimum value, as a maximum value, or as an arithmetic mean of the individual values recorded by the temperature sensors.

Preferably, a motor vehicle can comprise a battery management system according to the invention, as a result of which a motor vehicle according to the invention is produced.

In accordance with one advantageous enhancement, the motor vehicle comprises a navigation device, which is designed to make available required location data and/or positional data or else data derived therefrom to the battery management system for determining the quantity of energy that is to be recharged.

The invention also includes enhancements of the battery management system according to the invention, which have features such as those already described in connection with the enhancements of the method according to the invention. For this reason, the corresponding enhancements of the battery management system according to the invention as well as of a motor vehicle according to the invention that comprises such a battery management system are not described again here.

BRIEF DESCRIPTION OF THE DRAWINGS

Exemplary embodiments of the invention are described below, Shown for this purpose are.

DETAILED DESCRIPTION

For the exemplary embodiments explained below, what is involved are preferred embodiments of the invention. In the exemplary embodiments, the described components of the embodiments each represent individual features of the invention that are to be regarded as being independent of one another, each of which the invention further develops independently of one another, and, accordingly, which are to be regarded, also individually or in a combination different from that shown, as belonging to the invention. Furthermore, the described embodiments can also be supplemented by additional ones of the already described features of the invention.

In the figures, functionally equivalent elements are each furnished with the same reference numbers.

Figure 1:
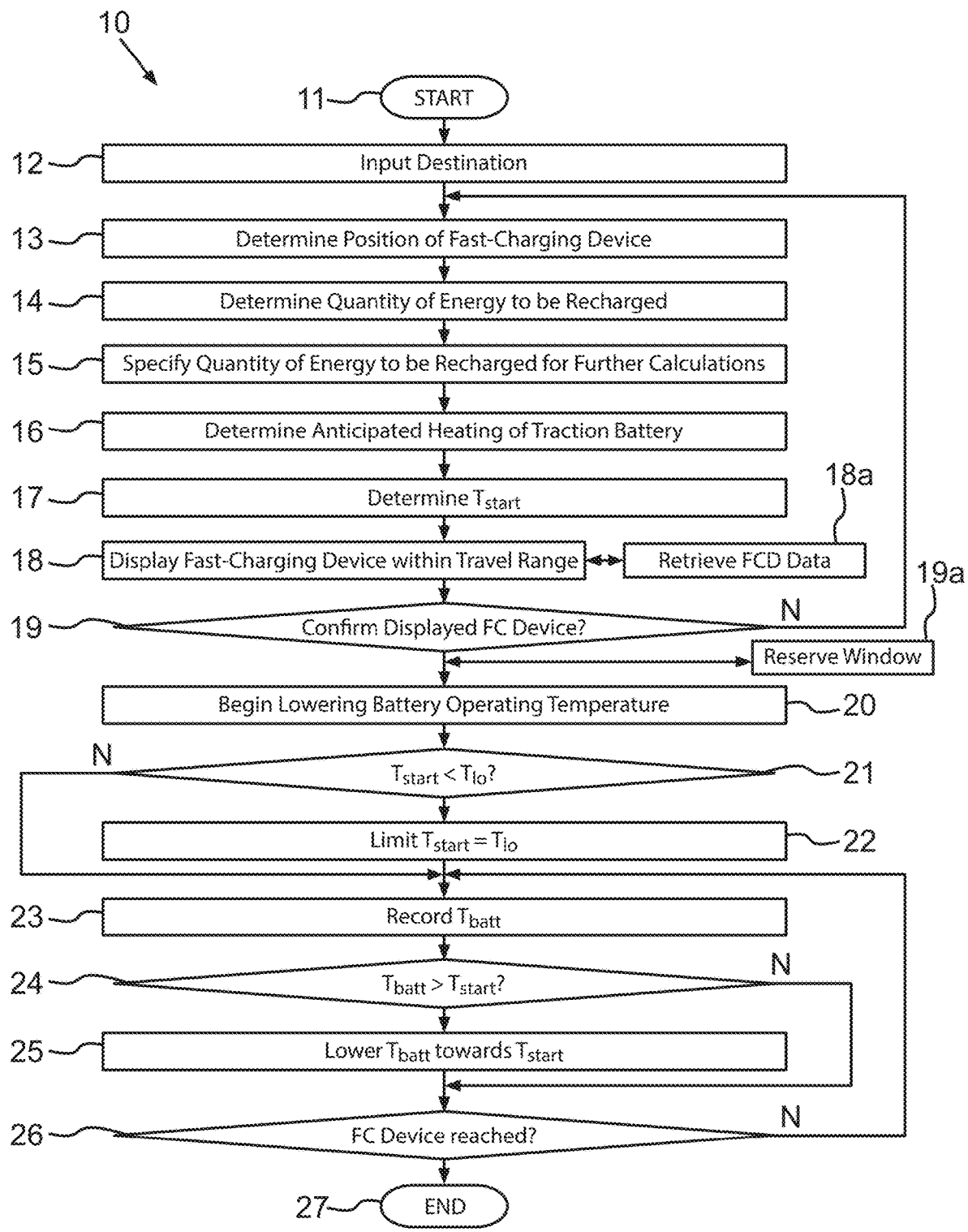
FIG. 1 in simplified schematic illustration, a preferred embodiment of a method according to the invention.
Figure 2:
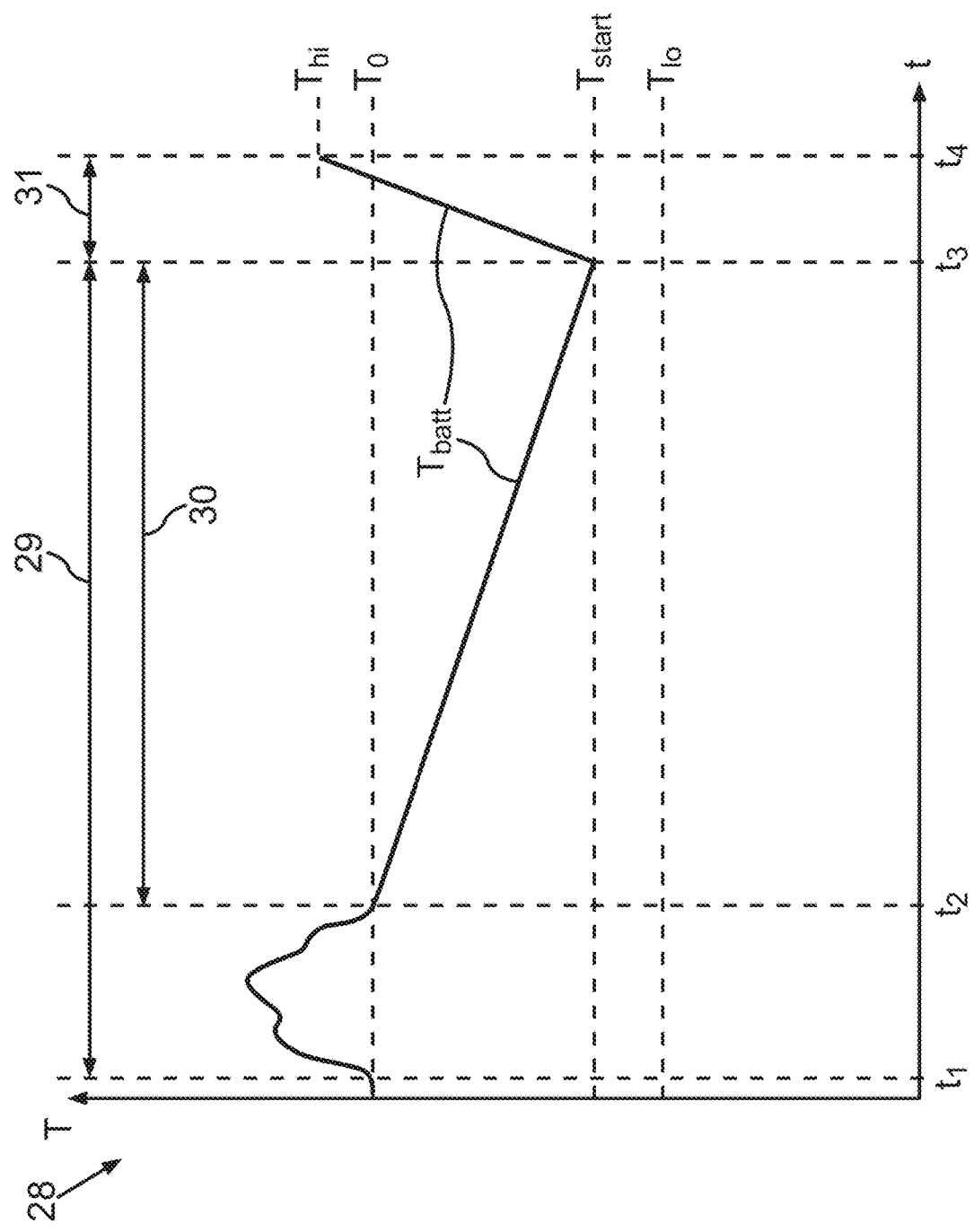
FIG. 2 in simplified schematic illustration, an exemplary course of a battery operating temperature in the application of the method according to the invention.
Figure 3:
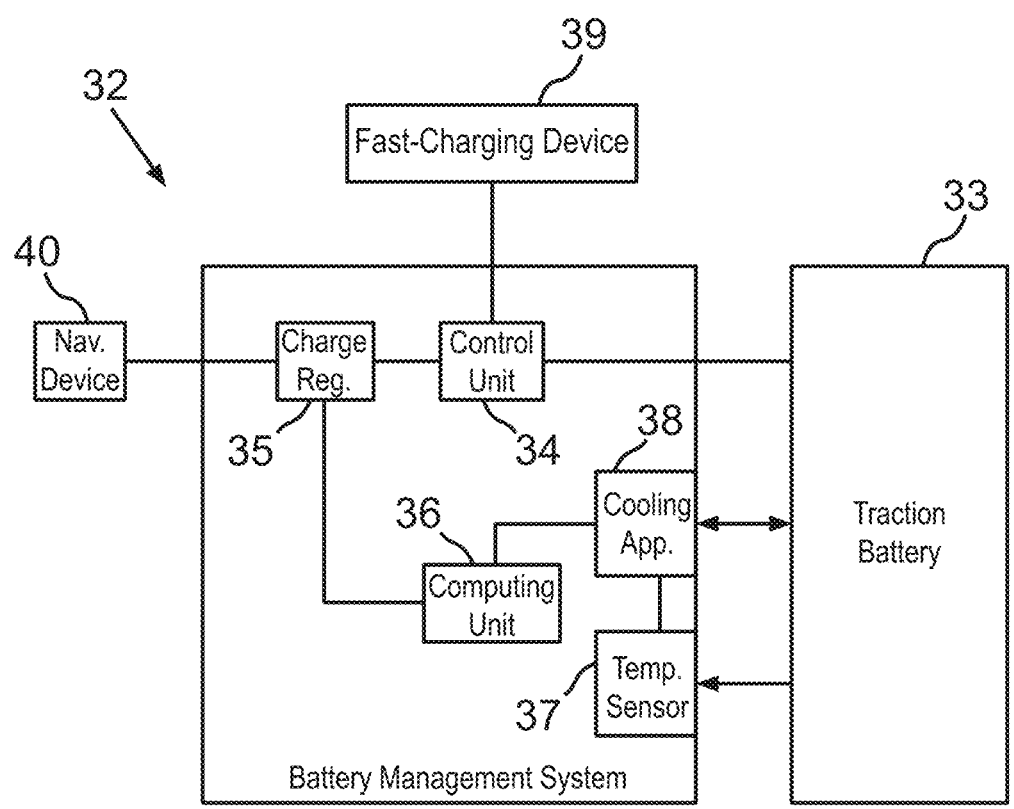
FIG. 3 in simplified schematic illustration, a preferred embodiment of a battery management system according to the invention.

In a preferred embodiment of the invention, a method 10 begins, as illustrated in FIG. 1, with a start 11. For better overview, reference numbers that are included only in FIG. 2 or FIG. 3 are introduced at this point. In a step 12, a destination is input by the user of the motor vehicle. The input of the destination here is made preferably by use of a navigation device 40 belonging to the vehicle.

In a further step 13, the determination of the position of a fast-charging device 39 is made depending on the position of the motor vehicle and depending on an available remaining travel range of the motor vehicle. The determination of the position of the fast-charging device can be made by use of the navigation device 40 belonging to the vehicle; in addition, further data, such as, for example, data obtained using a mobile Internet connection, can be analyzed.

In a further step 14, the quantity of energy to be recharged is determined depending on the destination specified in the navigation device of the motor vehicle and depending on further data. Included are, in particular, also the position of the destination as well as the position of the motor vehicle at the present time, which can be utilized as a basis for estimating a residual quantity of energy in the traction battery 33 when the motor vehicle reaches the fast-charging device 39.

In a further step 15, the quantity of energy to be recharged at the fast-charging device 39 is specified as a basis for further calculations.

In a further step 16, a heating of the traction battery 33 that is to be anticipated depending on charging capacity is determined, said charging capacity being determined from the quantity of energy that is to be recharged taking into consideration a predeterminable maximum charging time.

In a further step 17, a determination of a starting temperature $T_{start}$ for the battery charging follows in such a way that, after the charging operation has been carried out at the fast-charging device 39, a battery operating temperature $T_{batt}$ of the traction battery 33 does not exceed an upper limit $T_{hi}$ for the battery operating temperature.

In a further step 18, the fast-charging device 39 whose position has been determined to lie within the remaining travel range of the motor vehicle is displayed to a user of the motor vehicle.

In a further step 19, the user then has the possibility of confirming an intended use of the displayed fast-charging device 39. When the user does not wish to actuate the displayed fast-charging device 39, it is possible to go back to the method step 13 and to determine another fast-charging device 39. Branchings after a branch point, at which a check for a condition reveals that the condition is not met, are indicated by N in the flowchart in accordance with FIG. 1.

When, in step 19, the user provides a confirmation, the lowering of the battery operating temperature $T_{batt}$ to the starting temperature $T_{start}$ for the battery charging is started by a battery management system 32 in the following step 20. In the scope of the display of the fast-charging station in step 18, it is also possible in a parallel step 18a to retrieve further data on the state of the fast-charging device 39. For this purpose, it is possible especially advantageously to use a mobile network, such as, for example, an Internet access provided via the mobile wireless network. Accordingly, in step 19, the confirmation by the user of the motor vehicle can be supplemented by another parallel step 19a in that a charging time window at the fast-charging device 39 is reserved.

In a further step 21, the starting temperature $T_{start}$ for the battery charging is then compared with a lower limit $T_{lo}$ of the battery operating temperature, wherein, in a further step 22, the starting temperature $T_{start}$ for the battery charging is limited to the lower limit $T_{lo}$ of the battery operating temperature when the comparison reveals a lower starting temperature $T_{start}$ for the battery charging than the lower limit $T_{lo}$ battery operating temperature.

In a further step 23, the actual temperature of the traction battery 33 is recorded in the form of the battery operating temperature $T_{batt}$ in a driving operating state 29 of the motor vehicle and, in a following step 24, it is checked whether the recorded battery operating temperature $T_{batt}$ is higher than the starting temperature $T_{start}$ for the battery charging. If this is the case, then, in a following step 25, the battery operating temperature $T_{batt}$ is lowered in the driving operating state 29 to the starting temperature $T_{start}$ for the battery charging.

When, in a following step 26, the fast-charging device 39 is reached, the motor vehicle can be connected to it. Accordingly, the driving operating state 29 is ended (end 27) and a charging operating state 31 is initiated. In this charging operating state 31, as can be seen from the following statements, a fast charging of the traction battery 33 occurs with maximum available cooling capacity, with the battery operating temperature $T_{batt}$ rapidly rising during the fast-charging period.

Illustrated in FIG. 2 for an explanation of the method is a graph 28, in which the temperature T is plotted over the time t and a plotted curve for the battery operating temperature $T_{batt}$ is illustrated by way of example. Between a first point in time $t_1$ and a second point in time $t_2$, a normal driving operation takes place in the driving operating state 29. Here, depending on the power requirements placed on the traction battery 33 and on the parameterization of the coolant circulating circuit (battery cooling apparatus 38) in the driving operation, a temperature curve that is freely variable in a certain range is established. At the second point in time $t_2$, it is decided that it is necessary to drive toward the next fast-charging device 39 and a corresponding charging capacity is determined with which recharging should occur at the fast-charging device 39.

Starting from the second point in time $t_2$, the battery operating temperature $T_{batt}$ is then continuously lowered to the value of the starting temperature $T_{start}$ for the battery charging, which is reached at a third point in time $t_3$. Here, ideally at the same time, the arrival at the fast-charging device 39 and the beginning of the fast charging should occur. The time between the second point in time $t_2$ and the third point in time $t_3$, which is referred to as a preparation phase 30, thus serves for specific preparation of the traction battery 33 for the planned fast-charging operation with the maximum cooling capacity available in the motor vehicle. The preparation phase 30 in this case still belongs to the driving operating state 29 and, in the illustration in accordance with FIG. 2, ends at the same time as the point in time $t_3$, at which the charging operating state 31 follows seamlessly.

An initial temperature $T_0$ is here the value of the battery operating temperature $T_{batt}$ at the second point in time $t_2$. In particular, it can also be provided that the upper limit $T_{hi}$ of the battery operating temperature and the initial temperature $T_0$ are chosen to be identical in value.

The fast charging at the fast-charging device 39 is ended at a fourth point in time $t_4$. At the end of the fast-charging operation, the value of the battery operating temperature $T_{batt}$ is specified, as predetermined, as being the very value that is specified as a parameter for the upper limit $T_{hi}$ of the battery operating temperature.

For further explanation, several parameters with their typical values are included below. A targeted charging capacity for the fast-charging operation is 350 kilowatts. The maximum attained value of the battery operating temperature $T_{batt}$ after the fast charging should not lie higher than 40 degrees Celsius, because, immediately after the fast-charging operation, further driving should also still be possible with appropriate driving performance. Accordingly, for an expeditious further driving, the upper limit $T_{hi}$ of the battery operating temperature should ideally be 40 degrees Celsius. A typical degree of efficiency of a high-voltage battery using the currently available lithium ion technology is about 95 percent for fast charging. Accordingly, 5 percent of the supplied energy within the high-voltage battery is converted to lost heat. Typically, a lithium ion battery employed for a motor vehicle usually has a weight of about 650 kilograms. This value relates to an electric vehicle in the form of a passenger motor vehicle. The specific heat capacity of such a high-voltage battery (traction battery 33) is, on average over its various components, 1200 Joules per kilogram and Kelvin. As a maximum charging time for supplying 80 percent of the battery capacity, usually 15 minutes is assumed. As maximum available cooling capacity via a coolant circulation circuit (battery cooling apparatus 38) in the motor vehicle, 6 to 8 kilowatts is estimated.

Accordingly, the method according to the invention can be illustrated on the basis of the following calculation by way of example. For fast charging with 350 kilowatts, the thermal dissipation power loss of the traction battery 33 is:

$$P_{loss} = 350 \text{ kilowatts} \times (1-95\%) = 17.5 \text{ kilowatts}.$$

The thermal capacity to be taken up by the thermal mass of the traction battery 33 in the case when, during fast charging, the battery is heated within 15 minutes from 25 degrees Celsius to a final temperature of 40 degrees Celsius is:

$$P_{therm} = \frac{650 \text{ kilograms} \times 1200 \text{ Joules}}{\text{kilogram and Kelvin}} \times \frac{40 \text{ degrees Celsius} - 25 \text{ degrees Celsius}}{15 \text{ minutes} \times 60 \text{ seconds per minute}} = 13 \text{ kilowatts}$$

For this purpose, another 4.5 kilowatts are needed from the coolant circulation circuit of the vehicle during the fast charging, which lies within the maximum available cooling capacity (6-8 kilowatts).

The charged quantity of energy within the 15-minute charging time with a charging capacity of 350 kilowatts is:

$$E_{charged} = \frac{350 \text{ kilowatts} \times 15 \text{ minutes}}{60 \text{ minutes per hour}} = 87.5 \text{ kilowatt hours}$$

This quantity of energy is sufficient to drive further for about 350 kilometers. A time of 15 minutes for the charging operation is needed here only because the battery was nearly empty prior to the fast charging. When the traction battery 33 is driven only until half empty, it is necessary with the fast-charging operation to recharge only a quantity of energy of about 44 kilowatt hours, as a result of which the following charging time is obtained:

$$T_{charging\ time} = \frac{44 \text{ kilowatt hours}}{350 \text{ kilowatts}} \times 60 \text{ minutes per hour} = 7.5 \text{ minutes}.$$

The battery needs to be cooled only to 30 degrees Celsius during the driving operating state 29 in order not to exceed the targeted final temperature of 40 degrees Celsius after the fast charging.

$$T_0 = 40 \text{ degrees Celsius} - \frac{17.5 \text{ kilowatts} \times 7.5 \text{ minutes} \times 60 \text{ seconds}}{650 \text{ kilograms} \times \frac{1200 \text{ Joules}}{\text{kilogram and Kelvin}}} = 30 \text{ degrees Celsius}$$

For these initial conditions, no additional cooling capacity is required by the coolant circulation circuit during the fast charging. Accordingly, the air conditioning system can remained switched off, which is comfortable and energy-saving.

Accordingly, for example, by use of a traction battery 33 for an electric vehicle with a weight of 650 kilograms, which corresponds to an average value obtained for current battery technology and travel range, and by starting from a battery operating temperature $T_{batt}$ that, at the beginning of charging, lies at 25 degrees Celsius and thus lies at the value chosen for the starting temperature $T_{start}$ for the battery charging, it is possible for a constant thermal dissipation power loss of 13 kilowatts to be taken up by the thermal mass of the high-voltage battery within 15 minutes. Accordingly, after a 15-minute charging operation, the battery operating temperature $T_{batt}$ settles at 40 degrees Celsius, which poses no problem for further driving. In addition, it is possible, using the cooling capacity of 6 to 8 kilowatts from the air conditioning system of the vehicle, to cover the entire thermal dissipation power loss of 17.5 kilowatts during fast charging without any problem.

For a meaningful determination of the point in time starting from when the high-voltage battery needs to be cooled down specifically into the relatively low temperature range, it is appropriate to hook up the motor vehicle to the charging infrastructure via a network. Accordingly, the vehicle can use a corresponding operating strategy to obtain the necessary data as to when the battery will be depleted and as to when and in which charging station it can be recharged by means of fast charging, and also what time needs to be expended to be able to cool the traction battery 33 to the targeted temperature range with the use of the instantaneously available cooling capacity. This network connection with the charging infrastructure can be realized very simply through means that are already available at the present time.

A preferred exemplary embodiment of a battery management system 32 according to the invention is illustrated in FIG. 3. The battery management system 32 in this case comprises a control unit 34, a state of charge regulator 35, a simulation computing unit 36, a temperature sensor 37, and a battery cooling apparatus 38.

The battery cooling apparatus 38 is thermally coupled to a traction battery 33 in order to be able to lower the battery operating temperature $T_{batt}$ in the driving operating state 29 to the starting temperature $T_{start}$ for the battery charging. The temperature sensor 37 serves for recording the battery operating temperature $T_{batt}$ during a driving operating state 29 of the motor vehicle. The state of charge regulator 35 is coupled to a navigation device 40, via which it obtains data regarding the planned driving route as well as data that is further relevant to the driving itinerary, such as, for example, the distribution of charging devices. The control unit 34 serves for controlling the charging of the traction battery 33 with a fast-charging device 39 during the charging operating state 31, taking into consideration the quantity of energy that is to be recharged, as predetermined by the state of charge regulator 35. The simulation computing unit 36 serves for determining an anticipated heating of the traction battery 33 depending on charging capacity, which, taking into consideration a predeterminable maximum charging time, can be determined from the quantity of energy that is to be recharged. The starting temperature $T_{start}$ for the battery charging can be made available, as a target value, to the battery cooling apparatus 38 by the simulation computing unit 36, where it can be compared with the actual value in the form of the battery operating temperature $T_{batt}$, which is indicated by the temperature sensor 37, and, in the case in which the actual value exceeds the target value, the battery temperature can be lowered.

Overall, the examples show how the invention enables a concept for controlling the temperature of high-voltage batteries in electric vehicles during a fast charging to be realized at a smaller additional cost in comparison to a standard charging operation. Accordingly, it is possible to develop an optimized operating strategy for electric vehicles, for which, just prior to the fast charging, the high-voltage battery is cooled to and kept in a relatively low temperature range—for example, about 20 to 25 degrees Celsius—during the drive by using available cooling capacity through the air conditioning system of the vehicle.

The invention claimed is:

1. A method for operating a traction battery in a motor vehicle, wherein the traction battery is charged in a charging operating state with a fast-charging device, comprising:
   specifying at the fast-charging device a quantity of energy that is to be recharged,
   determining a heating of the traction battery depending on a charging capacity, which, taking into consideration a predeterminable maximum charging time, is determined from the quantity of energy that is to be recharged,
   determining a starting temperature ($T_{start}$) for the battery charging in such a way that, after the charging operation has been carried out at the fast-charging device, a battery operating temperature ($T_{batt}$) of the traction battery does not exceed an upper limit ($T_{hi}$) for the battery operating temperature,
   comparing the starting temperature ($T_{start}$) for the battery charging to a lower limit ($T_{lo}$) of the battery operating temperature,
   limiting the starting temperature ($T_{start}$) for the battery charging to the lower limit ($T_{lo}$) of the battery operating temperature when the comparison reveals a lower starting temperature ($T_{start}$) for the battery charging than the lower limit ($T_{lo}$) of the battery operating temperature, and
   recording the battery operating temperature ($T_{batt}$) in a driving operating state of the motor vehicle, and in the case that the recorded battery operating temperature ($T_{batt}$) is higher than the starting temperature ($T_{start}$) for the battery charging: lowering the battery operating temperature ($T_{batt}$) to the starting temperature ($T_{start}$) for the battery charging during the driving operating state.

2. The method according to claim 1, further comprising:
   determining an excess cooling capacity availability in the driving operating state,
   determining a quantity of thermal energy that is to be dissipated from the traction battery depending on the recorded battery operating temperature ($T_{batt}$) and the starting temperature ($T_{start}$) for the battery charging as well as determining a required temperature lowering time, depending on the excess cooling capacity available and depending on the quantity of thermal energy that is to dissipated,
   determining an anticipated arrival time ($t_3$) at the fast-charging device depending on a residual driving range remaining up to the fast-charging device,
   starting the lowering of the battery operating temperature ($T_{batt}$) at the latest at a point in time ($t_2$) that is determined from the anticipated arrival time minus the required temperature lowering time.

3. The method according to claim 1, further comprising:
   determining the quantity of energy that is to be recharged depending on a destination input into a navigation device of the motor vehicle.

4. The method according to claim 1, further comprising:
   determining a position of the fast-charging device, depending on a position of the motor vehicle and depending on an available remaining travel range of the motor vehicle.

5. The method according to claim 1, further comprising:
   specifying the quantity of energy that is to be recharged as a difference between the maximum quantity of energy that can be stored in a fully charged state of the traction battery and an anticipated residual quantity of energy remaining in the traction battery when the fast-charging device has been reached.

6. A battery management system for operating a traction battery in a motor vehicle, comprising:
   a control unit, configured to control the charging of the traction battery with a fast-charging device in a charging operating state,
   a state of charge regulator, configured to predetermine a quantity of energy to be recharged at the fast-charging device,
   a simulation computing unit configured to determine a heating of the traction battery that is to be anticipated depending on a charging capacity, which, taking into consideration a predeterminable maximum charging time, can be determined from the quantity of energy that is to be recharged,
   wherein the simulation computing unit is also configured to determine a starting temperature ($T_{Start}$) for the battery charging in such a way that, after the charging operation has been carried out at the fast-charging device, a battery operating temperature ($T_{batt}$) of the traction battery does not exceed an upper limit ($T_{hi}$) for the battery operating temperature, a temperature sensor is configured to record the battery operating temperature ($T_{batt}$) in a driving operating state of the motor vehicle,
   a battery cooling apparatus, configured to lower the battery operating temperature ($T_{batt}$) to the starting temperature ($T_{start}$) for the battery charging during the driving operating state in the case that the recorded battery operating temperature ($T_{batt}$) is higher than the starting temperature ($T_{start}$) for the battery charging;

wherein the starting temperature ($T_{start}$) for the battery charging is compared to a lower limit ($T_{lo}$) of the battery operating temperature, and the starting temperature ($T_{start}$) for the battery charging is limited to the lower limit ($T_{lo}$) of the battery operating temperature when the comparison reveals a lower starting temperature ($T_{start}$) for the battery charging than the lower limit ($T_{lo}$) of the battery operating temperature.

7. A motor vehicle having a battery management system for operating a traction battery in the motor vehicle, comprising:
- a control unit, configured to control the charging of the traction battery with a fast-charging device in a charging operating state,
- a state of charge regulator, configured to predetermine a quantity of energy to be recharged at the fast-charging device,
- a simulation computing unit configured to determine a heating of the traction battery that is to be anticipated depending on a charging capacity, which, taking into consideration a predeterminable maximum charging time, can be determined from the quantity of energy that is to be recharged,
- wherein the simulation computing unit is also configured to determine a starting temperature ($T_{Start}$) for the battery charging in such a way that, after the charging operation has been carried out at the fast-charging device, a battery operating temperature ($T_{batt}$) of the traction battery does not exceed an upper limit ($T_{hi}$) for the battery operating temperature, a temperature sensor is configured to record the battery operating temperature ($T_{batt}$) in a driving operating state of the motor vehicle,
- a battery cooling apparatus, configured to lower the battery operating temperature ($T_{batt}$) to the starting temperature ($T_{start}$) for the battery charging during the driving operating state in the case that the recorded battery operating temperature ($T_{batt}$) is higher than the starting temperature ($T_{start}$) for the battery charging;
- wherein the starting temperature ($T_{start}$) for the battery charging is compared to a lower limit($T_{lo}$) of the battery operating temperature, and the starting temperature ($T_{start}$) for the battery charging is limited to the lower limit ($T_{lo}$) of the battery operating temperature when the comparison reveals a lower starting temperature ($T_{start}$) for the battery charging than the lower limit ($T_{lo}$) of the battery operating temperature.

8. The method according to claim 4, further comprising:
displaying the fast-charging device whose position has been determined to lie within the remaining travel range of the motor vehicle, to a user of the motor vehicle,
confirming the intended use of the displayed fast-charging device by the user,
starting the lowering of the battery operating temperature ($T_{batt}$) to the starting temperature ($T_{start}$) for the battery charging by a battery management system.

9. The method according to claim 1, further comprising one or more of:
retrieving data on a state of the fast-charging device via a mobile network; and
reserving a charging time window at the fast-charging device.

* * * * *